(12) United States Patent
Crescenze et al.

(10) Patent No.: US 10,888,946 B2
(45) Date of Patent: Jan. 12, 2021

(54) TIG GUN POWER PIN FOR WELDING DEVICE OR SYSTEM AND MULTI-PROCESS WELDER WITH A SINGLE GAS FLOW PATH

(71) Applicant: Lincoln Global, Inc., City of Industry, CA (US)

(72) Inventors: Samuel P Crescenze, Massillon, OH (US); Brian M. Turk, Sagamore Hills, OH (US); Alexander C. Mehlman, Strongsville, OH (US); Jonathan D. Rosenberger, Santa Ana, CA (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 354 days.

(21) Appl. No.: 15/893,133

(22) Filed: Feb. 9, 2018

(65) Prior Publication Data

US 2018/0229325 A1 Aug. 16, 2018

Related U.S. Application Data

(60) Provisional application No. 62/457,413, filed on Feb. 10, 2017.

(51) Int. Cl.
*B23K 9/10* (2006.01)
*B23K 9/167* (2006.01)
(Continued)

(52) U.S. Cl.
CPC .......... *B23K 9/1012* (2013.01); *B23K 9/1056* (2013.01); *B23K 9/1062* (2013.01);
(Continued)

(58) Field of Classification Search
CPC .. B23K 9/1012; B23K 9/1056; B23K 9/1062; B23K 9/1068; B23K 9/1087; B23K 9/167; B23K 9/173; B23K 9/325
See application file for complete search history.

(56) References Cited

U.S. PATENT DOCUMENTS

| 6,359,259 B1 * | 3/2002 | Bunker | B23K 9/1006 219/130.21 |
| 6,855,914 B1 * | 2/2005 | Kaufman | B23K 9/133 219/130.5 |

(Continued)

FOREIGN PATENT DOCUMENTS

| AU | 2011100104 A4 | 2/2011 |
| CN | 104428096 A | 3/2015 |

(Continued)

OTHER PUBLICATIONS

Extended European Search Report from Corresponding Application No. EP18155787.7; dated Jul. 27, 2018; pp. 1-6.

(Continued)

*Primary Examiner* — Frederick C Nicolas
(74) *Attorney, Agent, or Firm* — Calfee, Halter & Griswold LLP; Brad C. Spencer

(57) ABSTRACT

A welding system includes a multi-process power supply, a TIG torch, and a TIG power pin for connecting the TIG torch to the multi-process power supply. The multi-process power supply has a power output connection for a MIG torch and a controller. The Controller is configured to command shielding gas and welding current to be provided to the power output connection, and the power output connection is configured to provide the shielding gas and the welding current to a MIG torch when the MIG torch is connected to the power output connection. The TIG power pin connects the TIG torch to the power output connection such that the power output connection is configured to provide the shielding gas and the welding current to the TIG torch. The controller is configured such that at least one of the shielding gas and the welding current is not provided to the TIG torch through the power output connection until a user engages a control member.

20 Claims, 8 Drawing Sheets

(51) Int. Cl.
*B23K 9/173* (2006.01)
*B23K 9/32* (2006.01)

(52) U.S. Cl.
CPC .......... *B23K 9/1068* (2013.01); *B23K 9/1087* (2013.01); *B23K 9/167* (2013.01); *B23K 9/173* (2013.01); *B23K 9/325* (2013.01)

(56) References Cited

U.S. PATENT DOCUMENTS

| | | | | |
|---|---|---|---|---|
| 7,323,659 B2* | 1/2008 | Ihde | ..................... | B23K 9/1336 |
| | | | | 219/137.71 |
| 7,952,051 B2* | 5/2011 | Veik | ..................... | B23K 9/1068 |
| | | | | 219/130.1 |
| 8,080,762 B2* | 12/2011 | Martin | ..................... | B23K 9/32 |
| | | | | 219/130.1 |
| 8,629,373 B2* | 1/2014 | Kaufman | ............... | B23K 9/124 |
| | | | | 219/130.1 |
| 8,785,817 B2* | 7/2014 | Luck | ..................... | B23K 9/1087 |
| | | | | 219/130.1 |
| 8,969,762 B2* | 3/2015 | Beeson | ................ | B23K 9/1006 |
| | | | | 219/130.1 |
| 9,481,045 B2* | 11/2016 | Spear | ..................... | B23K 9/067 |
| 9,610,646 B2* | 4/2017 | Romenesko | ............. | B23K 9/10 |
| 9,770,832 B2* | 9/2017 | Cossette | .............. | B25J 19/0029 |
| 2011/0006046 A1 | 1/2011 | Albrecht | | |
| 2013/0112660 A1 | 5/2013 | Enyedy et al. | | |
| 2016/0016249 A1 | 1/2016 | Bellile et al. | | |
| 2016/0016266 A1 | 1/2016 | Bellile et al. | | |
| 2017/0151622 A1 | 6/2017 | Dessart et al. | | |

FOREIGN PATENT DOCUMENTS

| | | |
|---|---|---|
| CN | 105531063 A | 4/2016 |
| DE | 101 61 091 A1 | 3/2003 |
| KR | 2016-0069650 A | 6/2016 |
| WO | 2007/142874 A2 | 12/2007 |
| WO | 2008/036471 A1 | 3/2008 |
| WO | 2015/036819 A1 | 3/2015 |
| WO | 2016/010608 A1 | 1/2016 |

OTHER PUBLICATIONS

Pappas Technologies, LLC; "TIG Torch Adapter for Lincoln Electric Welders: A better way to TIG with the 210MP . . . ;" http://tigadapter.com/; Dated 2015; pp. 1-2.

* cited by examiner

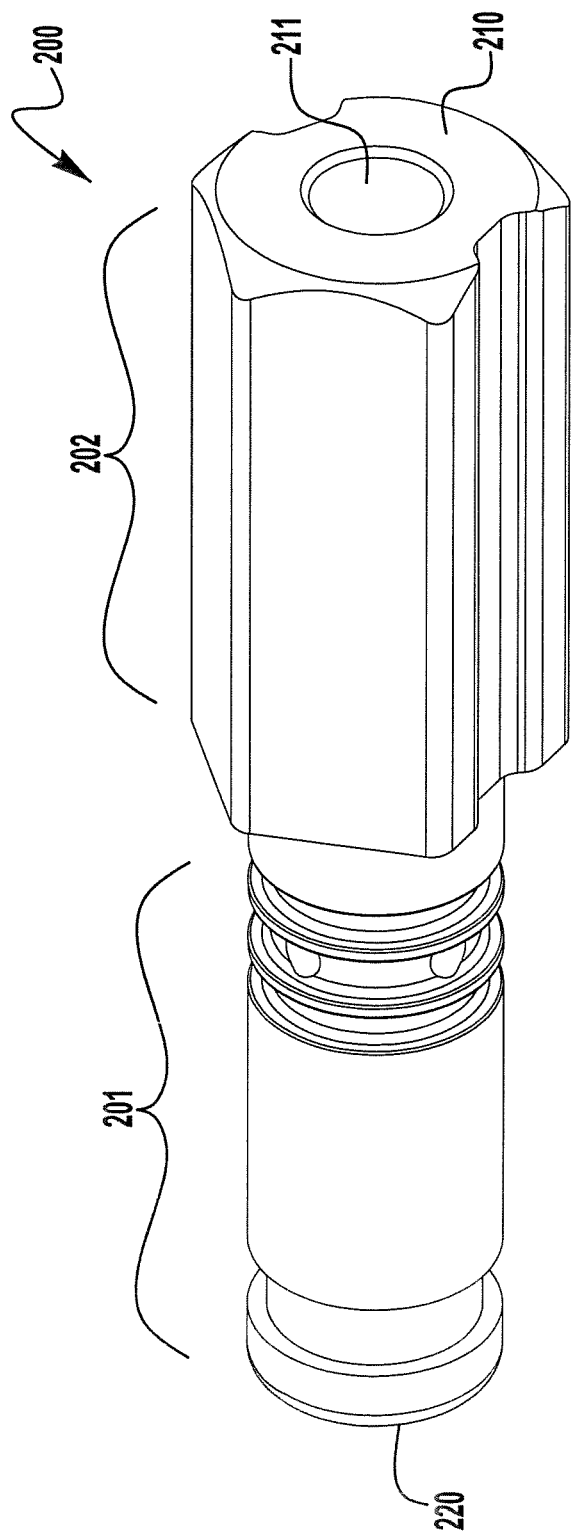
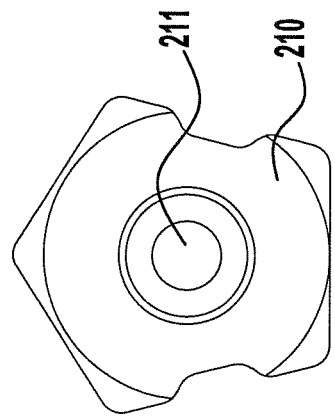
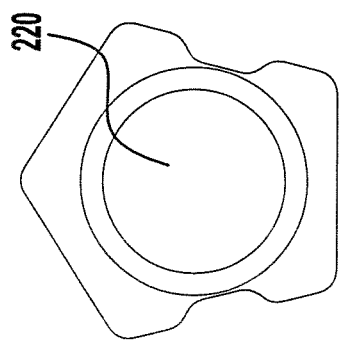
FIG. 5A
FIG. 5C
FIG. 5B

TIG GUN POWER PIN FOR WELDING DEVICE OR SYSTEM AND MULTI-PROCESS WELDER WITH A SINGLE GAS FLOW PATH

TECHNICAL FIELD

Devices, systems, and methods consistent with embodiments of the present invention relate to welding systems, and more specifically to multi process welding system and a TIG gun power pin for such a welding system.

BACKGROUND

In many welding applications it may be necessary to utilize different welding techniques and processes. For example, it may be necessary for some welds to use a gas metal arc welding process or a MIG process, and other welds may need to use a gas tungsten arc welding process or a TIG process. Because of this, multi-process welders have been developed which can provide operations for both a MIG process and a TIG process. However, because the welding torches are different for these processes, the multi-process welders typically have two separate connections —one for the MIG torch and one for the TIG torch. Because each process requires the use of shielding gas, internally in the welding power supply there are two gas flow paths, one to each connection. Because two gas flow paths are provided, they each can have their own gas flow regulators, solenoids, etc. This level of duplication adds cost, complexity and increases the possibility of failure or issues in the delivery of gas flow (e.g., shielding gas) to the welding operation.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention includes a multi-process welder having a single gas flow path to a single gas flow outlet to be used for multiple welding applications, and a TIG gun power pin that allows a TIG gun to be connected to a connection for a MIG gun in a multi-process power supply. Certain embodiments of the present invention include a multi-process power supply having a controller that is configured to command shielding gas and welding current to be provided to a TIG gun through a MIG gun connection and a TIG power pin after a user engages a control member and/or after an electrode of the TIG gun contacts a workpiece. Some embodiments of the present invention include a multi-process power supply having a controller that is configured to detect whether a MIG gun or a TIG gun is connected to the multi-process power supply.

An exemplary embodiment of a welding system includes a multi-process power supply, a TIG torch assembly, and a TIG power pin for connecting the TIG torch assembly to the multi-process power supply. The multi-process power supply has a power output connection for a MIG torch and a controller. The Controller is configured to command shielding gas and welding current to be provided to the power output connection, and the power output connection is configured to provide the shielding gas and the welding current to a MIG torch when the MIG torch is connected to the power output connection. The TIG torch assembly includes a TIG torch and a control member for controlling a level of the welding current, in which the foot pedal is in circuit communication with the controller of the multi-process power supply when the foot pedal is connected to the multi-process power supply. The TIG power pin connects the TIG torch to the power output connection such that the power output connection is configured to provide the shielding gas and the welding current to the TIG torch. The controller is configured to set the multi-process power supply to a TIG welding mode when at least one of the foot pedal and the TIG power pin is connected to the multi-process power supply such that at least one of the shielding gas and the welding current is not provided to the TIG torch through the power output connection until a user engages the foot pedal.

Another exemplary embodiment of a welding system includes a multi-process power supply, a TIG torch, and a TIG power pin for connecting the TIG torch to the multi-process power supply. The multi-process power supply has a power output connection for a MIG torch and a controller. The controller is configured to command shielding gas and welding current to be provided to the power output connection, and the power output connection is configured to provide the shielding gas and the welding current to a MIG torch when the MIG torch is connected to the power output connection. The TIG power pin connects the TIG torch to the power output connection such that the power output connection is configured to provide the shielding gas and the welding current to the TIG torch. The controller is configured to only provide shielding gas to the TIG torch through the power output connection when an electrode of the torch contacts a workpiece.

An exemplary methodology for providing shielding gas and welding current to a TIG torch includes providing a power supply, in which the power supply has a power output connection for a MIG torch and a controller. The controller is configured to command shielding gas and welding current to the power output connection, and the power output connection is configured to provide the shielding gas and the welding current to the MIG torch when the MIG torch is connected to the power output connection. The methodology further includes providing a TIG torch assembly that includes a TIG torch and a TIG power pin, in which the TIG power pin is configured for connecting a TIG torch to the power output connection. In addition, the methodology includes connecting the TIG power pin to the power output connection such that the TIG torch is connected to the power output connection, and the power output connection is configured to provide shielding gas and welding current to the TIG torch. The shielding gas is not provided to the TIG torch through the power output connection until at least one of a control member that is in circuit communication with the controller is engaged by a user or an electrode of the TIG torch contacts a workpiece.

BRIEF DESCRIPTION OF THE DRAWINGS

The above and/or other aspects of the invention will be more apparent by describing in detail exemplary embodiments of the invention with reference to the accompanying drawings, in which:

FIGS. 5A through 5G are diagrammatical representations of a TIG gun power pin in accordance with an embodiment of the present invention.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Exemplary embodiments of the power pin described herein are particularly applicable for use in connection with multi-process welding power supplies. The function and operation of multi-process power supplies are well known, and the power pin described herein can be used with various types of multi-process power supplies. In some embodiments, the welding power supplies as described herein can be used for TIG and MIG welding or TIG, MIG and stick welding, or various other combinations of welding processes. In certain embodiments of the present invention, the multi-process power supply can include a controller that controls the power supply based on the type of welding assembly (e.g., MIG welding assembly, TIG welding assembly, stick welding assembly, etc.) that is attached to the power supply. While exemplary embodiments discussed below are primarily directed to welding systems, embodiments can be used for cutting systems. The focus on welding systems is intended to be exemplary.

Figure 1:
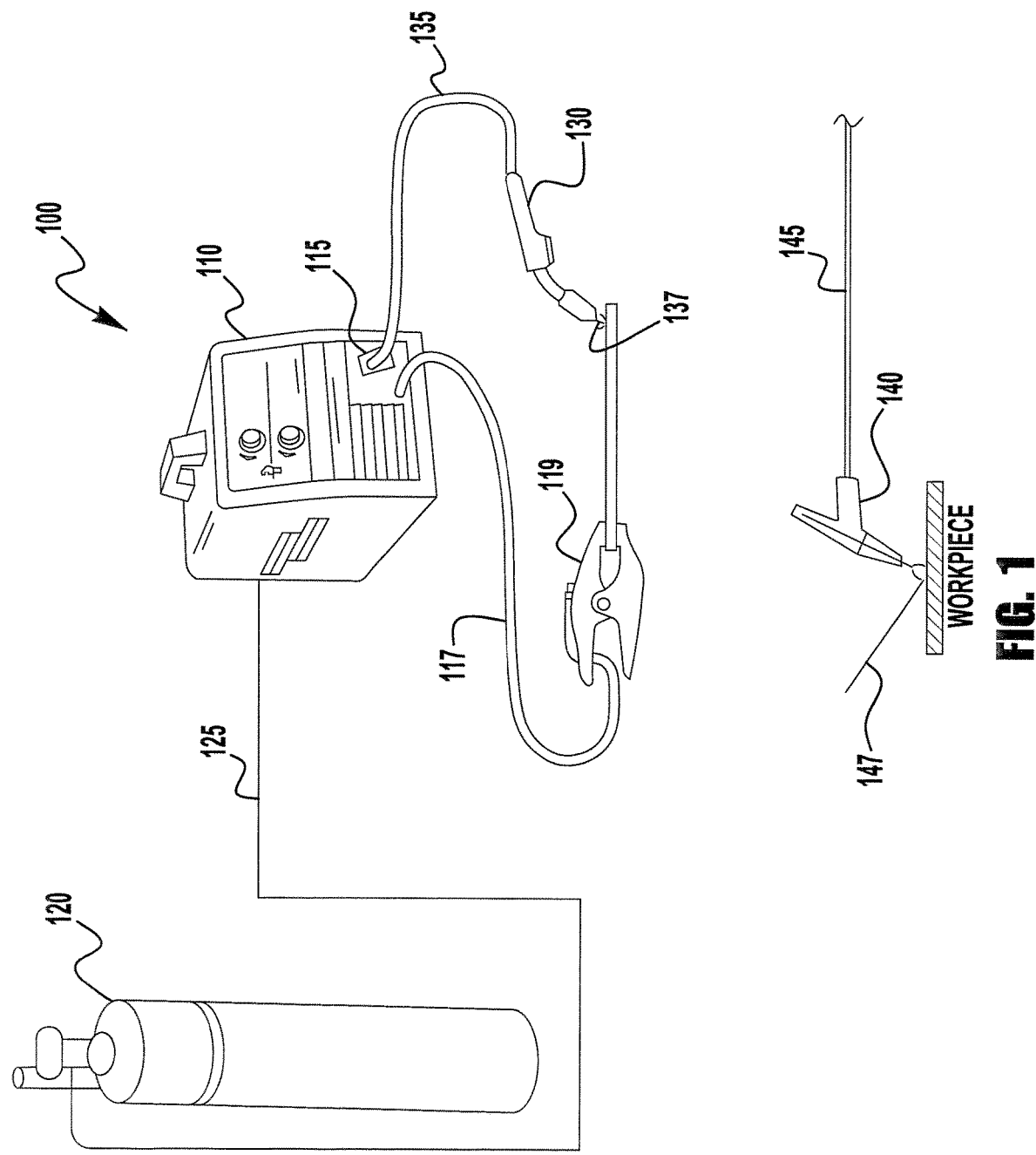
FIG. 1 is a diagrammatical representation of an exemplary welding system of the present invention.

Turning now to FIG. 1, an exemplary embodiment of a welding system 100 is shown. The system 100 comprises a welding power supply 110 which is capable of outputting a welding current for different welding processes. Because the internal control, the power output components, and the systems for generating and controlling the welding output are generally known, they are not described herein. Further, the power supply 110 can have internal wire feeding systems which allow the advancement of a MIG electrode during a MIG welding operation. These systems are generally known and need not be described herein. Such systems, however, can be found in the Lincoln Electric Power MIG™ products, manufactured by The Lincoln Electric Company, of Cleveland, Ohio.

Still referring to FIG. 1, the system 100 can also include a shielding gas source 120 which is coupled to the power supply 110 via a gas supply line 125. In addition to having various user input controls and user display devices, the power supply has a welding output power connection 115 to which the various welding process tools can be connected, as described herein. For example, as shown, for a MIG welding process, a MIG welding torch assembly 130 is coupled to the power output connection 115 via a MIG torch cable 135. As is generally known, the MIG torch cable delivers the welding current, shielding gas and consumable/electrode 137 to the welding operation. The system also utilizes a ground cable 117 and ground clamp 119 as is generally known. Because the power supply is a multi-process power supply, a TIG welding gun assembly 140 can also be connected to the power supply using a TIG gun cable 145. Unlike in a MIG process, the consumable or filler wire 147 is not delivered to the weld via the gun/cable, but can be delivered to the weld by the welder manually or via a separate wire feeder. Thus, in TIG welding, the cable 145 delivers the welding current and the shielding gas to the torch 140.

As described above, in known systems, because MIG and TIG processes are different, the existing systems use different power output connections for the TIG gun and the MIG gun. This requires the power supply 110 to have two separate shielding gas paths that are directed to the respective power output connections. This overly complicates the system and increases the likelihood of failure and operational issues. Certain embodiments of the present invention include a power supply having a single gas path and a single power output connection, in which the single gas path and the single power output connection are used for connecting both a MIG gun and a TIG gun to the power supply, which simplifies the system and decreases the likelihood of failure and operational issues with the system as compared to known systems.

Figure 2:
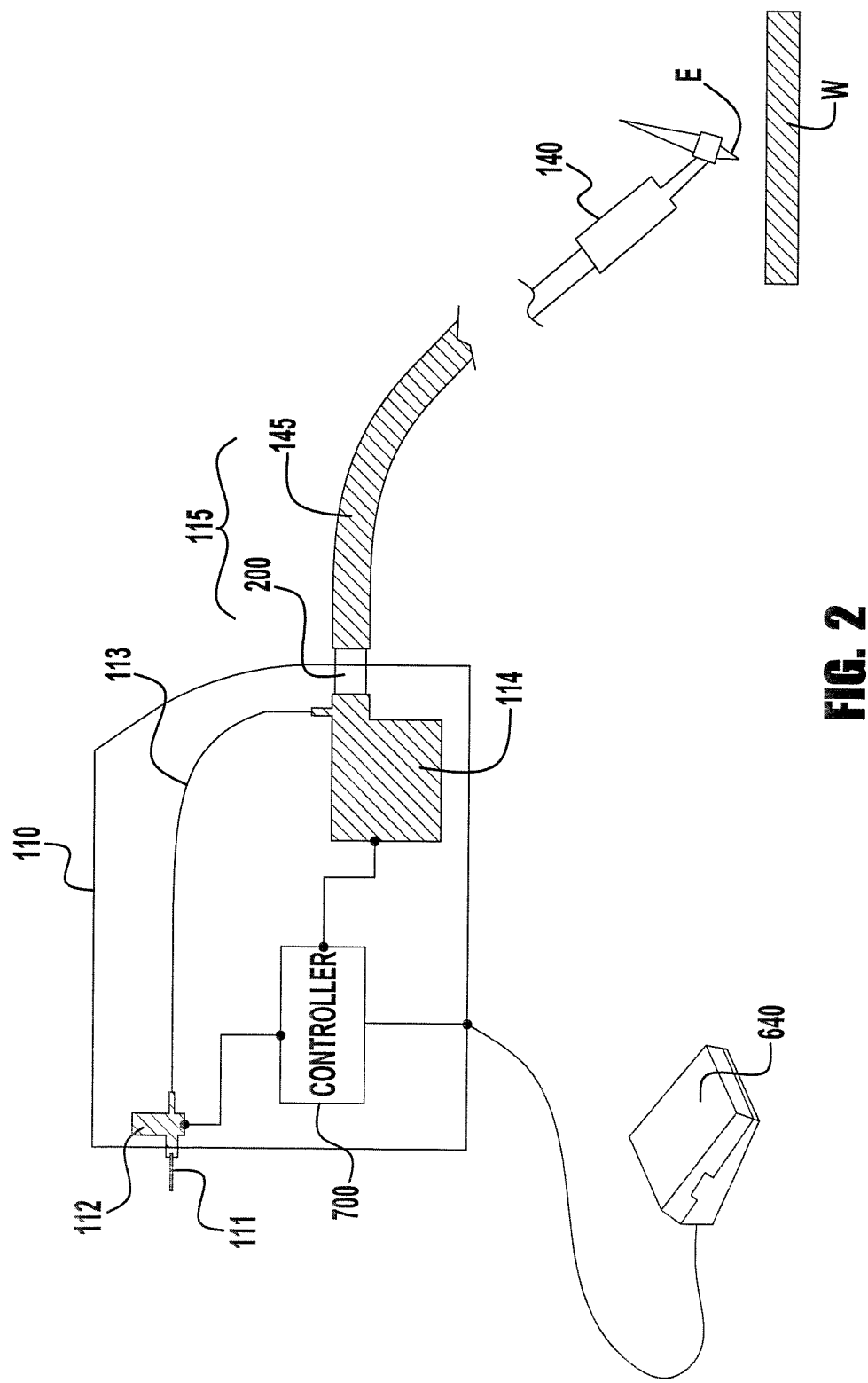
FIG. 2 is a diagrammatical representation of a multi-process power supply in accordance with an embodiment of the present invention.

Referring to FIG. 2, in certain embodiments, the power supply 110 contains a single gas inlet 111 to which the gas supply 125 is connected. Further, a single gas flow valve 112 (e.g., a solenoid valve) is within the gas flow system. It is noted that this solenoid valve 112 can be controlled and operated similar to known systems. Internal to the power supply 110, a gas hose/conduit 113 delivers the gas flow from the solenoid valve 112 to a feed plate assembly 114. The feed plate assembly 114 can be constructed similar to known feed plate assembly used on MIG welding machines, such as, for example, the feed plate assemblies described in U.S. Pat. No. 5,816,466, which is incorporated herein by reference in its entirety. The feed plate assembly 114 is in fluid communication with the hose 113 such that the feed plate assembly is capable of delivering the shielding gas from the hose 113 to the power output connection 115. In addition, the feed plate assembly can deliver a consumable/electrode to the power output connection 115 for a MIG welding operation. The feed plate assembly 114 is shown in more detail in FIG. 3. In some embodiments, the feed plate assembly 114 is not contained within the same enclosure as the power source, bit is a separate unit that is electrically connected to the power source via a control cable.

In the embodiment shown in FIG. 2, the TIG gun cable 145 is shown connected to the power output connection 115 using an exemplary embodiment of TIG gun power pin 200. In certain embodiments, the power pin 200 is permanently attached to a TIG gun cable 145. In other embodiments, the power pin 200 takes the form of an adapter that is configured (at a proximal end) to be attached to the power output connection, and that is configured (at a distal end) to be removably attached to the TIG gun cable 145. It is noted that, unlike known systems, both the TIG cable and torch assembly and the MIG cable and torch assembly, respectively, can be coupled to the same feed plate assembly 114 and power output connection 115, without modification of the feed plate assembly 114 or the power output connection 115. That is, the TIG gun power pin 200 allows a TIG gun to be attached to the same power output connection of the power supply that is used for connecting a MIG gun to the power supply. This is explained further below.

Figure 3:
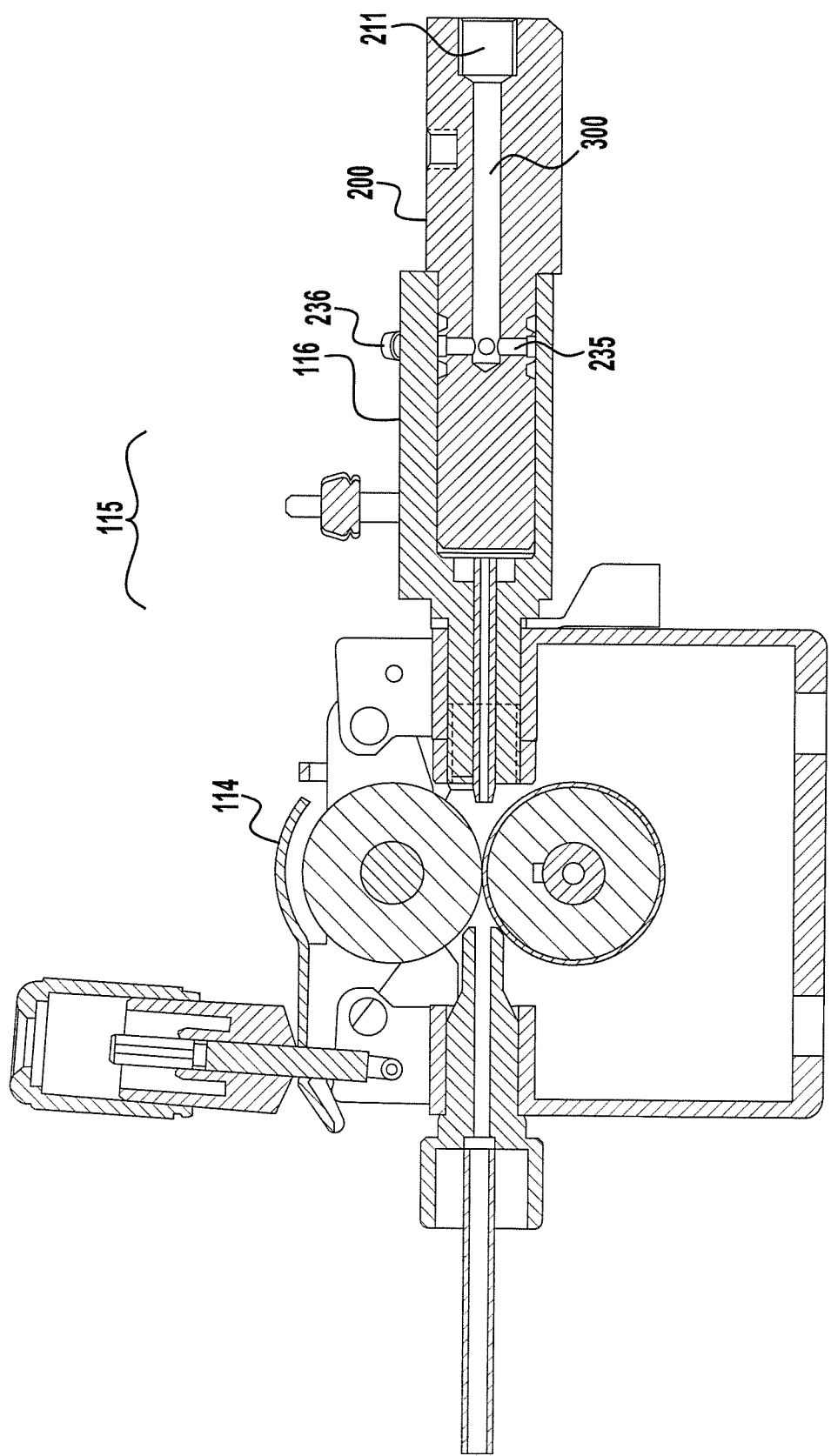
FIG. 3 is a diagrammatical representation of an exemplary connection in accordance with an embodiment of the present invention.

FIG. 3 illustrates the power pin 200 connected to the power output connection 115 and the feed plate assembly 114. As shown, the power output connection 115 has a female connection portion 116 coupled to the feed plate assembly 114 such that the TIG gun power pin 200 is inserted into the female connection portion 116 to attach a TIG gun to the feed plate assembly 114. The power pin 200 includes at least one gas flow port 235 that is aligned with a gas flow port 236 of the power output connection 115 when the power pin 200 is attached to female connection portion 116 of the power output connection, such that the gas flow port 235 is in fluid communication with the hose 113 and gas valve 112 of the power supply 110. The gas flow port 235 is also in fluid communication with the gas flow channel 300 and the cavity 211 of the power pin 200. Although a MIG gun assembly is not shown being attached to the female connection portion 116 of the power output connection 115, the same female connection portion 116 is used for attaching a MIG gun assembly to the power supply 110. When a MIG gun assembly is attached to the female connection portion 116, the gas flow port 236 of the power output connection is in fluid communication with the MIG gun assembly. Further, in embodiments where the power supply 110 is capable of stick welding, the stick welding cable can be connected to the same female connection portion 116. That is, in certain embodiments, the power pin 200 described herein can be attached to a stick welding torch such that stick welding torch is in fluid communication with the hose 113 and the gas valve 112 of the power supply 110. The power pin 200 is discussed further below.

Figure 4:
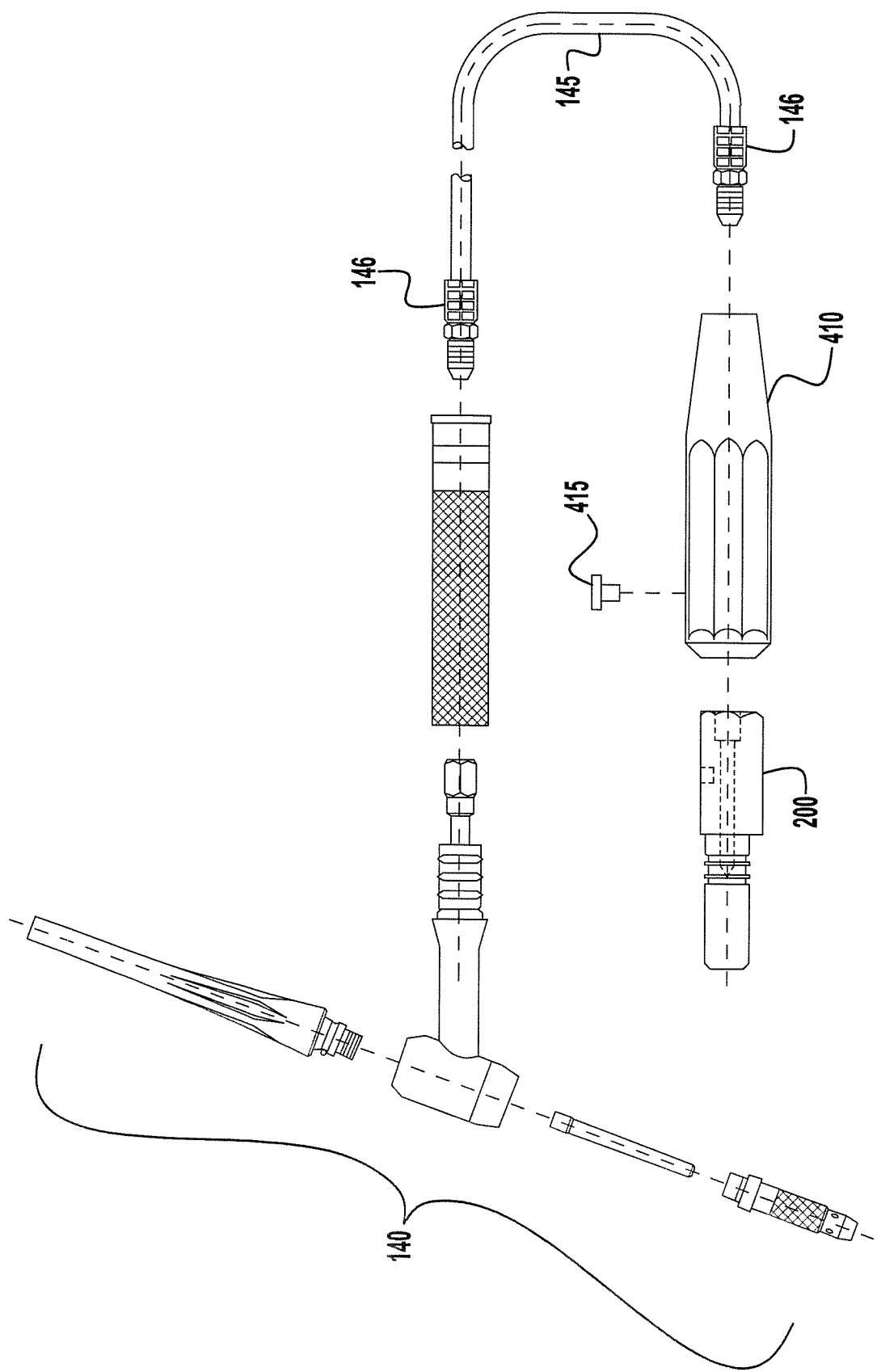
FIG. 4 is a diagrammatical representation of a TIG torch assembly and a TIG torch power pin in accordance with an embodiment of the present invention.

FIG. 4 depicts an exemplary TIG torch assembly 140 and TIG cable 145 with the power pin 200. As shown, the torch 140 has a configuration and assembly which is generally known, and embodiments are not limited thereto. In certain embodiments, the power pin 200 takes the form of an adapter, and the cable 145 (which delivers the welding current and the shielding gas to the torch 140) is coupled to the torch 140 and the power pin 200 via connectors 146, such that the power pin is removably attached to the cable 145. In some embodiments, the power pin 200 can be permanently attached to the cable 145. In various embodiments, a cover sleeve 410 is provided that covers at least a portion of the power pin 200. The cover sleeve 410 allows a user to easily couple the power pin 200 to the connector 116, and the cover sleeve is configured to insulate a portion of the power pin when the power pin is connected to the power output connection 115. The sleeve 410 can be permanently attached to the power pin 200, or the sleeve 410 can be removably attached to the power pin 200. In embodiments in which the sleeve 410 is removably attached to the power pin 200, the sleeve 410 can be slidable relative to the power pin 200 and can be secured into position via a set screw 415 or other similar connection. In these exemplary embodiments, each of the sleeve 410 and the set screw 415 can be made from plastic, hard rubber, or other non-conductive type of material.

Figure 5D:
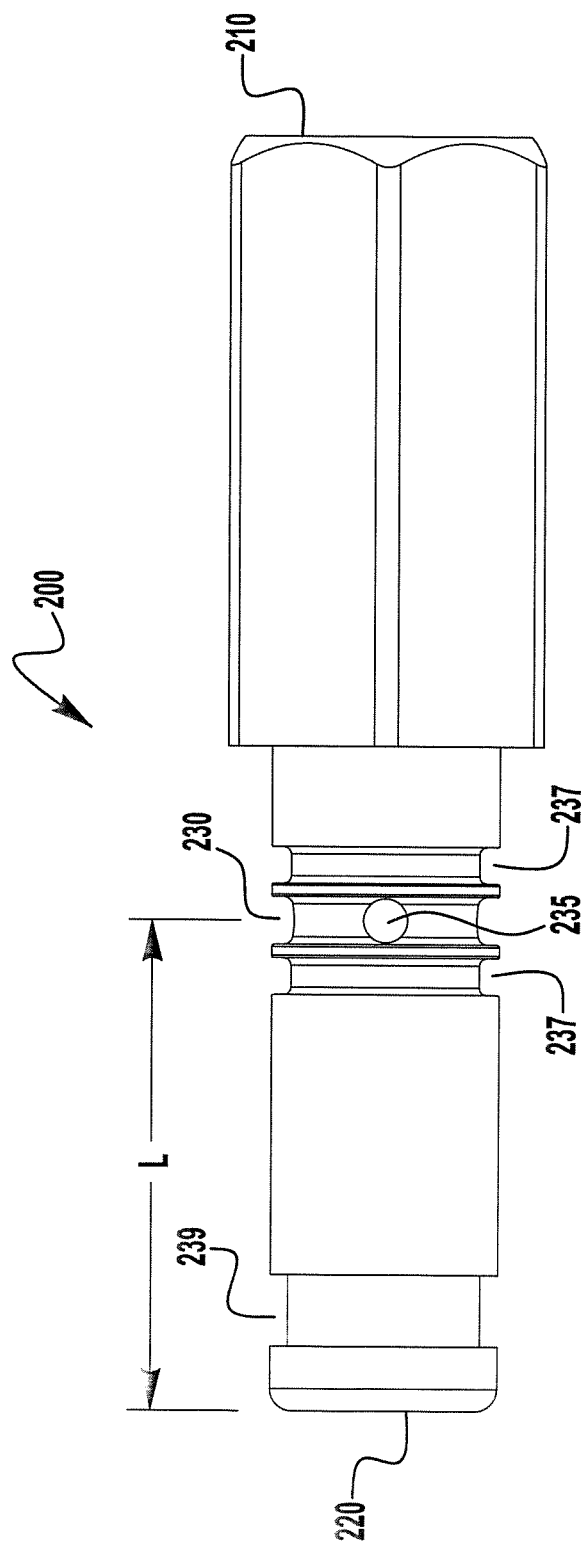

FIGS. 5A through 5G show various views of an exemplary power pin 200 of the present invention. FIG. 5A is an asymmetric view of the power pin 200, whereas FIG. 5B is a view of the proximal end face 220 or front of the power pin, and FIG. 5C is a view of the distal end face 210 or the back of the power pin 200. As shown, the power pin 200 has an insertion portion 201 (that includes the proximal end face 220) and a body portion 202 (that includes the distal end face 220), where the insertion portion 201 is the portion that is inserted into the connector 115 and the body portion 202 is covered by the sleeve 410 and can be gripped by a user to insert the power pin into the connector 115. The power pin is configured so as to mate with the same connector 115 that is used for a MIG welding operation. The distal end face 210 has a cavity 211 into which a connector 146 of the TIG cable 145 is inserted (if the power pin 200 takes the form of an adapter). If the TIG cable 145 is permanently attached to the TIG power pin, the TIG cable 145 is attached to the body portion 202 of the power pin 200 such that the cavity 211 is in fluid communication with the TIG cable 145. Unlike the distal end face 210, the proximal end face 210 does not have a cavity or a through port because the power pin need not have a pass through for a consumable (as is needed for a MIG welding operation). It is noted that the power pin can 200 be made of a material, such as, for example, brass, copper, silver, gold, aluminum, etc. In certain embodiments, the power pin 200 is a single, integral component. Further, while the cross section of the insertion portion 201 is shown as circular, embodiments are not limited to a circular cross-section so long as the insertion portion is capable of being inserted into the same connector 115 that is used for a MIG welding operation. Further, the cross-section of the body portion 202 is shown as having a generally 5-sided, non-symmetrical shape (see e.g., FIG. 5C). Embodiments of the body portion 202 are not limited to this cross-sectional configuration, as others can be used as well.

FIG. 5D depicts a bottom view of the power pin 200. Although it should be noted that because of the circular cross-section of the insertion portion 201, the power pin is not limited to a top or bottom orientation when inserted into the connector 115. The description of top, bottom, side, etc. are intended to only provide general orientation. As shown, the insertion portion 201 comprises a gas flow channel 230, which is recessed relative to the outer perimeter of the insertion portion 201. The gas flow channel 230 is located at a position along the length of the insertion portion 201 such that it aligns with a gas flow port 236 within the connector 115 when the power pin is connected to the connector 115 (as shown in FIG. 3). That is, because a shielding gas is used in a MIG welding operation, the connector 115 has gas flow ports 236 that direct the shielding gas into the MIG gun cable 135 via its connection. Thus, the TIG power pin has a gas flow channel 230 positioned to receive the gas flow from gas flow ports 236 within the connector 115. Within the channel 230 is at least one flow port 235 which directs the flow from the channel 230 into a gas flow channel 300 (see FIG. 3) that is in fluid communication with the cavity 211. Thus, the gas flow (e.g., shield gas flow) from the connector 115 is directed into the channel 230 through at least one port 235 and into the channel 300 and cavity 211 so that the gas flow can be directed to the TIG torch 140 via the cable 145. In the illustrated embodiment, the power pin 200 has four ports 235. However, in other embodiments, a lesser or greater amount of ports 235 can be used. For example, some embodiments can have between 4 and 6 ports 235. The number of ports 235 should be sufficient to provide adequate gas flow, and some exemplary embodiments are not limited by the number thereof.

Also, as shown, the power pin 200 includes at least two O-ring channels 237, where one is positioned upstream and one is positioned downstream of the gas flow channel 230. The O-ring channels 237 are used to seat O-rings to provide a gas flow seal when the power pin 200 is inserted into the connector 115. Further, the insertion portion 201 also comprises a lock channel 239 which is used to removably lock or secure the power pin 200 to the connector 115. In certain embodiments, the connector 115 can have a bias portion (not shown) that couples with the lock channel 239 to use a bias force to lock the power pin 200 into the connector 115. The lock channel 239 is positioned in a similar location as to a corresponding channel on a MIG torch power pin to take advantage of the same biasing/connection mechanism in the connector 116. The connection between the channel 239 of the power pin 200 and the connector 115 can take any suitable form, such as, for example, any form known for connecting a MIG power pin to a power supply. In certain embodiments, the connection between the channel 239 and the power pin 200 can be made, for example, using a thumb screw, a set screw, or a spring-loaded clip mechanism.

In exemplary embodiments, the flow channel 230 is positioned a distance L from the proximal end face 220 in the range of 30% to 50% of the overall length (from proximal end face 220 to distal end face 210) of the power pin 200. In other exemplary embodiments, the channel 230 is positioned a distance L from the proximal end face 220 in the range 35% to 45% of the overall power pin length. Further, in exemplary embodiments, the diameter of the ports 235 is in the range of 80% to 100% of the width of the channel 230. In other exemplary embodiments, the diameter of the ports 235 is in the range of 90% to 95% of the width of the channel 230. In other exemplary embodiments, the ports 235 may have different diameters. For example, in some embodiments, half of the ports have a first diameter, and the other half has a second, different diameter.

Figure 5E:
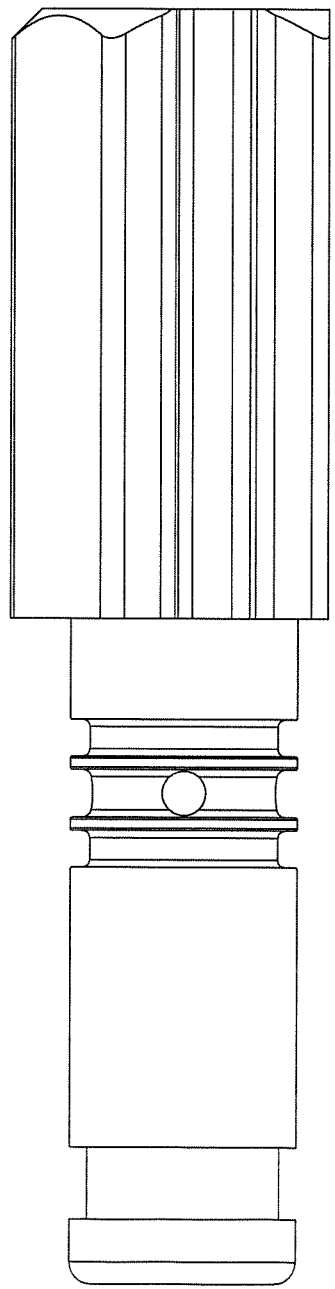
Figure 5F:
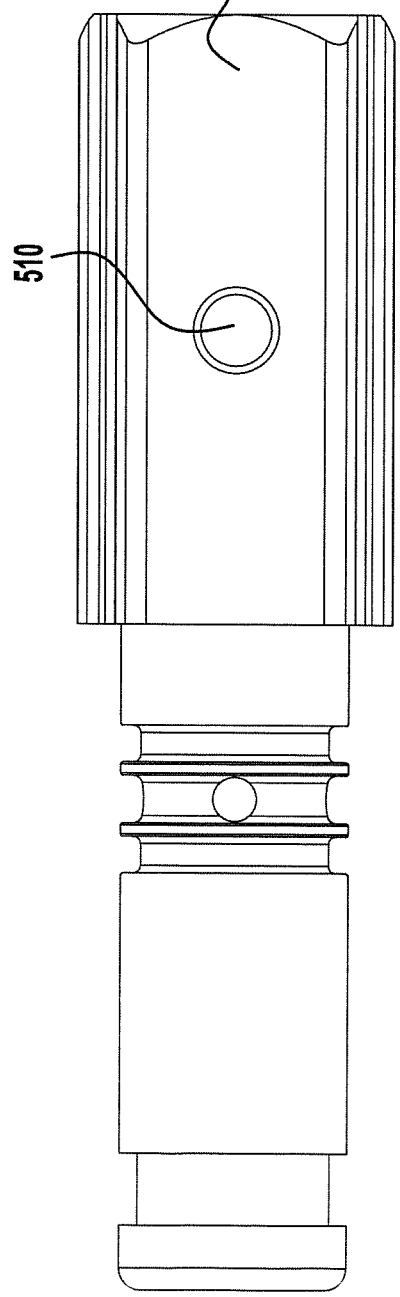
Figure 5G:
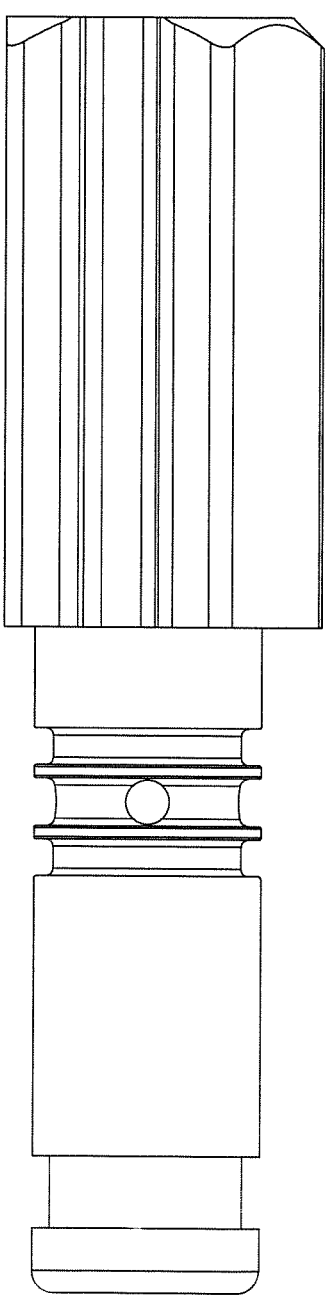

Turning now to FIGS. 5E, 5F and 5G, each of FIGS. 5E and 5G show side views of the power pin 200, and FIG. 5F shows a top view of the power pin 200. As shown in FIG. 5F, in certain embodiments, the body portion 202 of the power pin 200 has a set surface 501 which comprises a set screw port 510. In such embodiments, the set screw 415 couples with port 510 to secure the sleeve 410 onto the body portion.

Figure 6:
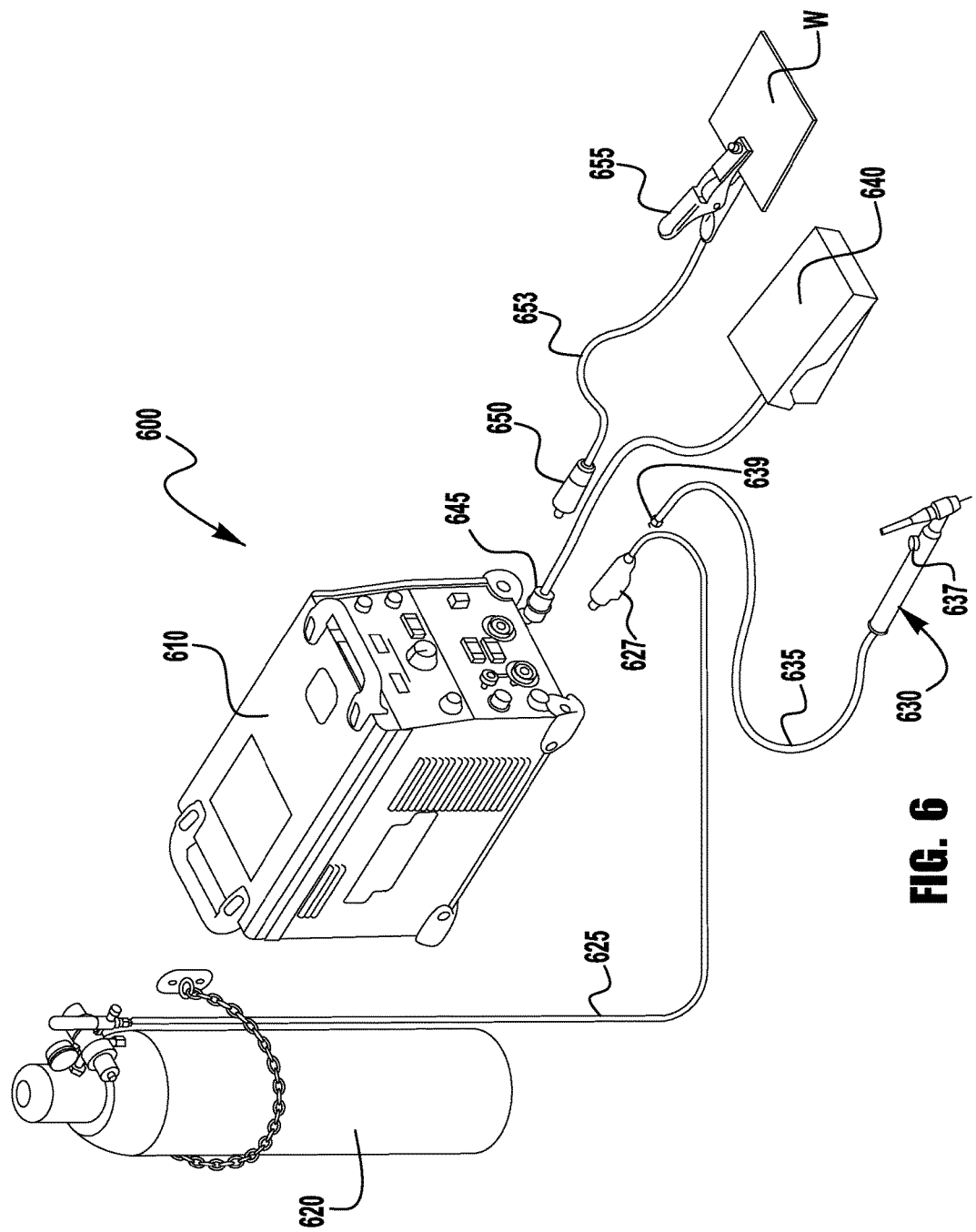
FIG. 6 is a diagrammatical representation of an embodiment of an existing system.

FIG. 6 depicts an exemplary system 600 representative of a known type of TIG system. As shown, the system 600 has a welding power supply 610 and a shield gas source 620. In such a system, the gas source 620 is connected to a gas connector 627 via a gas line 625. The gas connector 627 couples to a TIG specific connector on the power supply 610 and the gas does not flow through the power supply 610. This adds a further complexity to existing systems. Then, as shown a TIG torch 630 is coupled to the connector 627 via a line 635 and a connector 639. The torch 630 has a manual gas flow valve 637 to allow a user to turn on an off the gas flow. TIG systems also often include a control member (e.g., a foot pedal, an arc start switch, a Hand Amptrol, etc.) that is used to control the level of current during a welding operation. In the illustrated embodiment, the system 600 has a foot pedal assembly 640 coupled to the power supply with a connector 645. The construction and use of foot pedals are known and need not be described herein. The system also comprises a ground cable 653 having a clamp 655 and connector 650 for connecting to the power supply 610. In such a system, the power supply provides the TIG welding current to the torch 630 through the connector 627, connector 639, and cable 635. Further, as explained above, the gas does not flow through the power supply or a power supply solenoid, but instead flows through the cable 625 to the cable 635 and is only controlled by the manual valve 637. Thus, there is very little control of the gas flow, and the potential exists for a user to forget to turn the gas on, or turn the gas off. Also, in known systems, when the power supply is in TIG mode, the TIG current can be always "on" which means the TIG electrode is always "hot." In such systems, there is a risk that the user accidentally touches the electrode or inadvertently strikes an arc by touching the work piece before the user is ready, which provides a significant disadvantage to known systems. However, in exemplary embodiments of the present invention, the above issues associated with known systems are eliminated. For example, referring to FIG. 2, the foot pedal 640 can be in circuit communication with a controller 700 of the power supply 110. The controller 700 can be any suitable CPU, programmable microprocessor, or processor based controller that can control the operation of the power supply 110, such as, for example, any controller described in U.S. Pat. No. 5,278,390, which is incorporated herein by reference in its entirety. In such embodiments, the controller 700 is configured to detect the connection of the foot pedal 640 to the power supply 110. This can be done via any known connection sensing/detecting technology, such as, for example, an electrical jumper, closing of a proximity switch, detection of current flow in the remote leads, or any other known connection sensing/detecting technology. When the controller detects the presence of the foot pedal 640, the power supply is set to "TIG welding mode," and the controller 700 commands the power supply 110 to "OFF," such that no output current/power is directed to the torch 140. This increases the safety of the system because the TIG electrode is not hot when the power supply is "OFF," which prevents the risks associated with a user accidently touching the electrode or inadvertently touching a workpiece with the torch 140. When the foot pedal is engaged by a user (e.g., depressed) the controller 700 commands the power supply 110 to provide the set output current/power to the torch 140. That is, the output power to the torch 140 is only supplied when the foot pedal is depressed.

In certain exemplary embodiments, when the controller 700 detects the presence of the foot pedal 640, the controller 700 causes the solenoid valve 112 to be in a closed position such that gas is prevented from flowing through the power supply 110. When the foot pedal 650 is engaged by a user, the controller 700 commands the solenoid valve 112 to move to an open position such that gas can flow through the power supply 110, the power pin 200, the TIG cable 145, and torch 140. That is, rather than a user having to remember to manually open/close the gas valve on the torch 140, the gas flow is controlled by the foot pedal 640 automatically. In some systems, gas flow can still be controlled by a manual valve or user control on the torch 140 when a foot pedal is not detected as being coupled to the controller 700.

While the above-mentioned systems are described as using a foot pedal 640 that is in circuit communication with the controller 700, it should be understood that these systems can also use other control members that are in circuit communication with the controller 700, such as, for example, an arc start switch or a Hand Amptrol. That is, when the controller 700 detects the presence of any control member described herein, the power supply can be set to "TIG welding mode," and the controller commands the power supply 110 to "OFF," such that no output current/power is directed to the torch 140. Then, when the control member is engaged by the user, the controller 700 commands the power supply 110 to provide the set output current/power to the torch 140. In addition, when the controller 700 detects the presence of any control member, the controller 700 can cause the solenoid valve 112 to be in a closed position such that gas is prevented from flowing through the power supply 110, the power pin 200, the TIG cable 145, and the torch 140.

In certain exemplary embodiments, the gas flow can be controlled by detecting contact between the electrode E of the torch 140 and the workpiece W. In such embodiments, the controller 700 is in circuit communication with the feed plate or able to receive a signal from the torch 140 when the electrode E makes contact with the workpiece. In such embodiments, the controller 700 causes the power supply to provide a detection signal to the electrode E of the torch 140, which can be, for example, an OCV voltage signal. In an exemplary embodiment of the present invention, the controller 700 controls the solenoid valve 112 such that the solenoid valve is in a closed position and no gas flow can be provided until a detection event is detected by the controller 700. For example, during its use a user would cause the electrode E to contact the workpiece W and this contact is detected by the controller 700, which causes the controller 700 to command the solenoid valve 112 to move to an open position such that gas can flow through the power supply 110, the power pin 200, the TIG cable 145, and torch 140. Then, in some embodiments, once the gas flow is started the controller 700 will allow a welding output to be provided to the torch by the power supply, for example when a foot pedal is depressed. When the welding operation is stopped, for example when the user takes his/her foot off of the foot pedal the controller 700 causes the power supply to stop outputting a welding power and/or stop the gas flow.

In some exemplary embodiments, the controller 700 can detect the type of torch that is connected to the power supply. As explained herein, embodiments of the present invention are configured such that a number of different welding tools (e.g., MIG welding tools, TIG welding tools, stick welding tools, etc.) can be coupled to the same power output connection on a power supply. Thus, in exemplary embodiments of the present invention, the controller 700 can detect the specific type of torch coupled to the power supply 110 and can be configured to alter the user input settings or automatically switch to the proper welding configuration based on the type of detected torch. For example, when a user connects a TIG torch as described herein, the controller 700 detects that a TIG torch is connected and automatically switches the user input parameters to be of the type associated with a TIG welding operation. Such embodiments avoid a scenario where a user would leave the power supply configured for a stick or MIG welding operation in error. The detection of the type of torch can be done, for example, by a unique groove on the power pin, a unique length of the power pin, or any other unique feature of the power pin. In some embodiments, each torch type can have a separate electrical identifier/tag (e.g., an RFID tag), and the controller is configured to sense identifier and control the power supply based on the sensed identifier. Of course, other known identification methodologies can be used to ensure that the power supply is automatically set up for the proper welding operation.

By using embodiments of the present invention, as described herein, a multi-process welding power supply can have only a single gas solenoid and gas path to a single gas outlet. This is accomplished by using a TIG gun power pin, as described herein, which can couple and engage with a power connection output for a MIG gun power pin on a power supply. In addition, embodiments of the present invention can include a multi-process welding power supply that utilizes a controller that is configured to adjust the welding power and/or flow of gas based on the type of welding tools that are connected to the power supply. Thus, embodiments of the present invention significantly improve the functionality of multi-process welding power supplies, while greatly reducing the reliability and functionality issues experienced with systems using multiple gas flow systems and gas flow outlets to accommodate different welding processes.

While the disclosed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the described subject matter without departing from its scope. Therefore, it is intended that the described subject matter not be limited to the particular embodiment disclosed, but that the disclosed subject matter will include all embodiments falling within the scope of the present specification.

The invention claimed is:

1. A welding system, comprising:
   a multi-process power supply comprising a power output connection for a MIG torch and a controller, wherein the controller is configured to command shielding gas and welding current to be provided to the power output connection, and wherein the power output connection is configured to provide the shielding gas and the welding current to the MIG torch when the MIG torch is connected to the power output connection;
   a TIG torch assembly comprising a TIG torch and a control member for controlling a level of the welding current, wherein the control member is in circuit communication with the controller of the multi-process power supply when the control member is connected to the multi-process power supply;
   a TIG power pin for alternatively connecting the TIG torch to the power output connection of the multi-process power supply, such that the power output connection is configured to provide the shielding gas and the welding current to the TIG torch when the TIG power pin connects the TIG torch to the power output connection;
   wherein the controller is configured to set the multi-process power supply to a TIG welding mode when at least one of the control member and the TIG power pin is connected to the multi-process power supply such that at least one of the shielding gas and the welding current is not provided to the TIG torch through the power output connection until a user engages the control member,
   wherein the power output connection comprises a female connection portion, wherein the TIG power pin comprises an insertion portion that is disposed within the female connection portion when the TIG power pin is connected to the power output connection and a body portion that extends from the female connection portion when the TIG power pin is connected to the power output connection, and wherein the insertion portion comprises at least one flow channel or port that aligns with a gas port of the power output connection when the TIG power pin is connected to the multi-process power supply, and
   wherein the TIG power pin comprises a sleeve that covers the body portion when the TIG power pin is connected to the power output connection.

2. The welding system according to claim 1, wherein the welding current is not provided to the TIG torch through the power output connection until the user engages the control member when the multi-process power supply is set to the TIG welding mode.

3. The welding system according to claim 1, wherein the shielding gas is not provided to the TIG torch through the power output connection until the user engages the control member when the multi-process power supply is set to the TIG welding mode.

4. The welding system according to claim 1, wherein the multi-process power supply further comprises a shielding gas path having a solenoid valve, wherein the shielding gas path is in fluid communication with the power output connection, and wherein the solenoid valve is in circuit communication with the controller such that the controller can move the solenoid valve between an open position and a closed position.

5. The welding system according to claim 4, wherein the multi-process power supply has a feed plate assembly that is in fluid communication with the shielding gas path and the power output connection.

6. The welding system according to claim 1, wherein the control member comprises a foot pedal.

7. The welding system according to claim 1, wherein the controller of the multi-process power supply is configured to determine whether the MIG torch or the TIG torch is connected to the power output connection, and wherein the controller is configured to alter one or more user input settings of the multi-process power supply based on whether the MIG torch or the TIG torch is connected to the power output connection.

8. The welding system according to claim 1, wherein the TIG power pin is attached to the TIG torch.

9. The welding system according to claim 8, wherein the TIG power pin is removably attached to the TIG torch.

10. The welding system according to claim 1, wherein the TIG power pin is removable from the TIG torch.

11. A welding system, comprising:
a multi-process power supply comprising a power output connection for a MIG torch and a controller, wherein the controller is configured to command shielding gas and welding current to be provided to the power output connection, and wherein the power output connection is configured to provide the shielding gas and the welding current to the MIG torch when the MIG torch is connected to the power output connection;
a TIG torch;
a TIG power pin for alternatively connecting the TIG torch to the power output connection of the multi-process power supply, such that the power output connection is configured to provide the shielding gas and the welding current to the TIG torch when the TIG power pin connects the TIG torch to the power output connection;
wherein the controller is configured to only provide shielding gas to the TIG torch through the power output connection when an electrode of the TIG torch contacts a workpiece,
wherein the power output connection comprises a female connection portion, and wherein the TIG power pin comprises an insertion portion that is disposed within the female connection portion when the TIG power pin is connected to the power output connection and a body portion that extends from the female connection portion when the TIG power pin is connected to the power output connection, and
wherein the TIG power pin comprises a sleeve that covers the body portion when the TIG power pin is connected to the power output connection.

12. The welding system according to claim 11, wherein the multi-process power supply further comprises a shielding gas path having a solenoid valve, wherein the shielding gas path is in fluid communication with the power output connection, and wherein the solenoid valve is in circuit communication with the controller such that the controller can move the solenoid valve between an open position and a closed position.

13. The welding system according to claim 12, wherein the multi-process power supply has a feed plate assembly that is in fluid communication with the shielding gas path and the power output connection.

14. The welding system according to claim 11, wherein the TIG power pin comprises at least one flow channel or port that aligns with a gas port of the power output connection of the multi-process power supply when the TIG power pin is connected to the power output connection.

15. The welding system according to claim 11, wherein the insertion portion comprises at least one flow channel or port that aligns with a gas port of the power output connection of the multi-process power supply when the TIG power pin is connected to the multi-process power supply.

16. The welding system according to claim 15, wherein the body portion comprises a distal face, and wherein the distal face comprises a cavity that is in fluid communication with at least one flow port of the insertion portion.

17. The welding system according to claim 11, wherein the controller of the multi-process power supply is configured to determine whether the MIG torch or the TIG torch is connected to the power output connection, and wherein the controller is configured to alter one or more user input settings of the multi-process power supply based on whether the MIG torch or the TIG torch is connected to the power output connection.

18. The welding system according to claim 11, wherein the TIG power pin is attached to the TIG torch.

19. The welding system according to claim 18, wherein the TIG power pin is removably attached to the TIG torch.

20. The welding system according to claim 11, wherein the TIG power pin is removable from the TIG torch.

* * * * *